E. J. LOCKWOOD.
WHEELED-HARROWS.
No. 194,695. Patented Aug. 28, 1877.
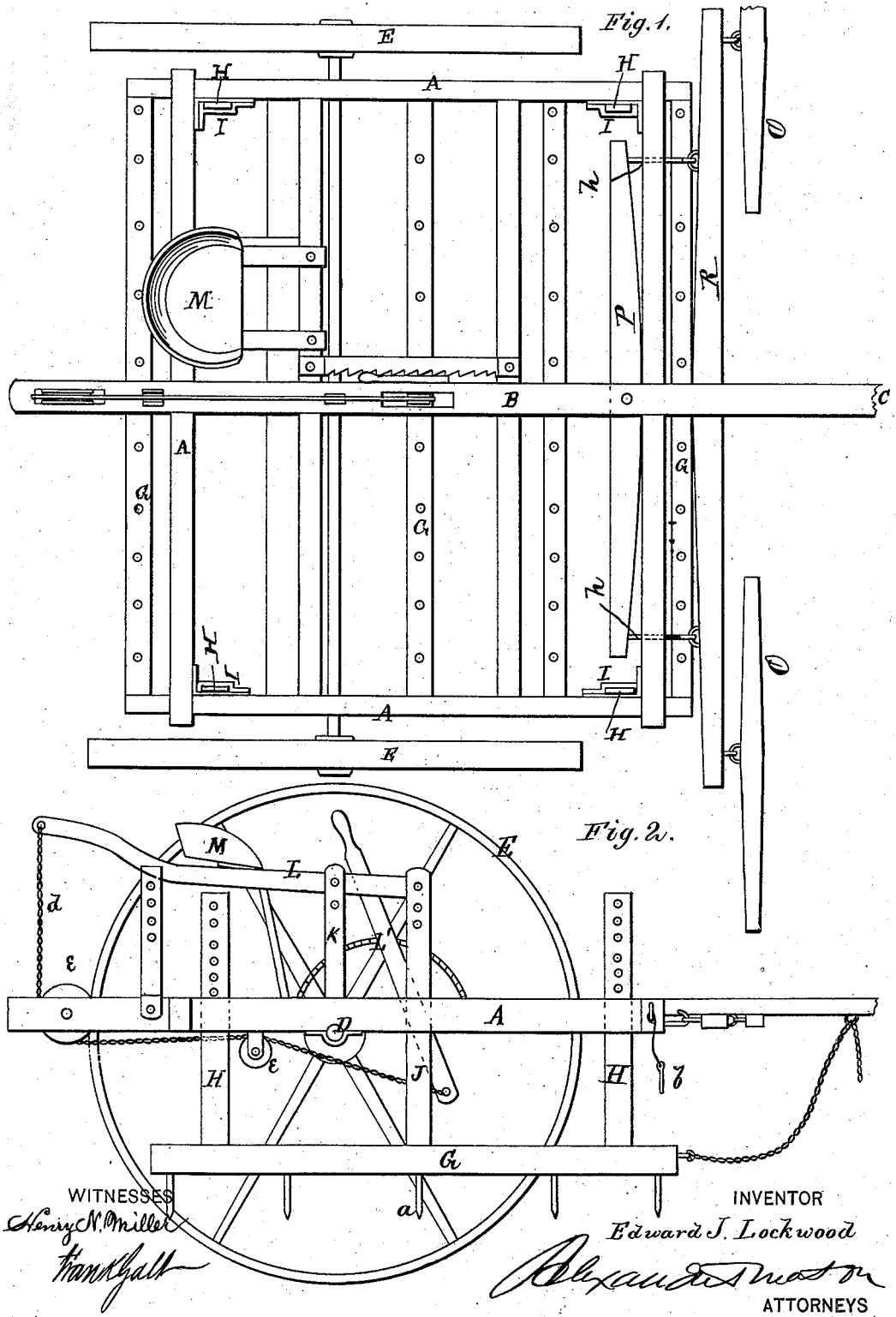

UNITED STATES PATENT OFFICE.

EDWARD J. LOCKWOOD, OF DANBURY, OHIO.

IMPROVEMENT IN WHEELED HARROWS.

Specification forming part of Letters Patent No. 194,695, dated August 28, 1877; application filed June 26, 1877.

*To all whom it may concern:*

Be it known that I, EDWARD J. LOCKWOOD, of Danbury, in the county of Ottawa, and in the State of Ohio, have invented certain new and useful Improvements in Wheeled Harrows; and do hereby declare that the following is a full, clear, and exact description thereof, reference being had to the accompanying drawings, and to the letters of reference marked thereon, making a part of this specification.

The nature of my invention consists in the construction and arrangement of a wheel-harrow, as will be hereinafter more fully set forth.

In order to enable others skilled in the art to which my invention appertains to make and use the same, I will now proceed to describe its construction and operation, referring to the annexed drawing, in which—

Figure 1 is a plan view of my harrow. Fig. 2 is a side elevation of the same.

A represents a frame of any suitable construction, provided with a center beam, B, which is extended forward, and forms the tongue C, or has said tongue secured to it.

In suitable boxes under this frame is placed the axle D, carrying on its ends the driving-wheels E E.

G represents the harrow-frame proper, consisting of a series of parallel bars connected at the ends and in the center, and provided with teeth a, as shown.

At each side of the harrow-frame G, near the front and rear, are attached bars H H, which extend upward and pass through guide-loops I I attached to the corners of the sulky-frame A, for guiding the harrow-frame in its up-and-down movement. The bars H are perforated, and pins b may be passed through either of the holes in said bars above the loops I, for holding the harrow-frame at any desired height.

The harrow-frame is raised by the following means: In the center of the harrow-frame is pivoted a bar, J, which extends up through a mortise in the beam B, and has one end of a lever, L, attached to its upper end. This lever is pivoted to a standard, K, on said beam, and its rear end may be operated by the driver from his seat M, which is elevated above the main frame A; or a cord or chain, d, may be attached to the rear end of the lever L and pass around pulleys e e, as shown in Fig. 2, and connect with the lower end of a lever, L', pivoted to the side of the beam B in front of the seat M.

By this device even a boy may drive and operate the harrow.

This harrow, as constructed, is intended for pulverizing the earth and leveling the ground, filling up all hollows in the same, as the earth is carried forward by the teeth and deposited in any depressions or hollows there may be in the ground.

When used as a harrow the single-trees O O are connected to short rods h, which pass through the front cross-bar of the main frame, and are attached to the ends of a double-tree, P, behind said front cross-bar.

When, however, the harrow is to be used for weeding out corn, a longer bar, R, is attached to the front ends of the rods h h, and the single-trees O O connected to the ends of said bar R, whereby the horses are made to travel outside of the rows of corn.

The harrow is under perfect control, and adjustable for either hard or mellow ground, for the purpose of breaking crust, as any desired weight may be put on the harrow by adjusting it to the sulky-frame, as described, the object being to break any crust formed over planted seed without going down far enough to injure the seed.

Having thus fully described my invention, what I claim as new, and desire to secure by Letters Patent, is—

In combination with the harrow-frame, adjusted, as herein described, at its four corners, the perforated central bar J, lever L, chain d, pulleys e, and lever L' for regulating the same, as set forth.

In testimony that I claim the foregoing I have hereunto set my hand this 8th day of June, 1877.

EDWARD J. LOCKWOOD.

Witnesses:
FRANK GALT,
J. O. SCHROEDER.